US010372158B2

(12) United States Patent
Dominguez et al.

(10) Patent No.: US 10,372,158 B2
(45) Date of Patent: Aug. 6, 2019

(54) INTER-CHIP TIME SYNCHRONIZATION

(71) Applicant: Apple Inc., Cupertino, CA (US)

(72) Inventors: Charles Dominguez, Redwood City, CA (US); Mete Fikirlier, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/706,570

(22) Filed: Sep. 15, 2017

(65) Prior Publication Data

US 2018/0081390 A1 Mar. 22, 2018

Related U.S. Application Data

(60) Provisional application No. 62/396,068, filed on Sep. 16, 2016.

(51) Int. Cl.
G06F 1/12 (2006.01)
H04W 56/00 (2009.01)
G06F 1/14 (2006.01)

(52) U.S. Cl.
CPC .............. G06F 1/12 (2013.01); G06F 1/14 (2013.01); H04W 56/001 (2013.01); H04W 56/0045 (2013.01)

(58) Field of Classification Search
CPC .... G06F 1/12; H04W 56/001; H04W 56/0045
See application file for complete search history.

(56) References Cited

U.S. PATENT DOCUMENTS

| 2011/0035511 | A1* | 2/2011 | Biederman | G04G 7/00 709/248 |
| 2011/0231565 | A1* | 9/2011 | Gelter | H04L 49/90 709/231 |
| 2014/0122915 | A1* | 5/2014 | Frels | G06F 1/12 713/400 |
| 2016/0209867 | A1* | 7/2016 | Millington | H04J 3/0664 |
| 2017/0099644 | A1* | 4/2017 | Kindred | G06F 1/12 |

* cited by examiner

Primary Examiner — Freshteh N Aghdam
(74) Attorney, Agent, or Firm — Morgan, Lewis & Bockius LLP

(57) ABSTRACT

A device implementing an inter-chip time synchronization system may include a first circuit having a first clock and a second circuit having a second clock. The first circuit may be configured to capture a first timestamp from the first clock responsive to receiving a sampling signal from the second circuit. The first circuit may be configured to receive a second timestamp that was captured by the second circuit from a second clock of the second circuit. The second timestamp may have been captured by the second circuit when the sampling signal was transmitted to the first circuit. The first circuit may be configured to generate a conversion parameter for converting from the second clock of the second circuit to the first clock of the first circuit based at least in part on the first and second timestamps, and to store the generated conversion parameter.

21 Claims, 8 Drawing Sheets

INTER-CHIP TIME SYNCHRONIZATION

CROSS-REFERENCE TO RELATED APPLICATIONS

The present application claims the benefit of U.S. Provisional Patent Application Ser. No. 62/396,068, entitled "Inter-Chip Time Synchronization," filed on Sep. 16, 2016, which is hereby incorporated by reference in its entirety for all purposes.

TECHNICAL FIELD

The present description relates generally to chip synchronization, including inter-chip time synchronization for devices in a distributed wireless system.

BACKGROUND

Sound system applications can often use two or more speakers to render audio, such as stereo audio having left and right channels. Information received at the speakers can be rendered when it is received. In conventional applications, signals are conveyed over wires and arrive substantially simultaneously. In wireless applications, latency may be introduced along one or more signal paths. As a result, audio information corresponding to different channels, e.g., left and right channels, may not be rendered at the same time. This can result in noticeable artifacts, which may diminish the user experience.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

In a distributed wireless system, a wireless device, such as a wireless speaker, may be synchronized with one or more other wireless devices, such as an audio source device and/or one or more other wireless speakers, to perform one or more operations that are synchronized across multiple wireless devices, such as audio beamforming and/or audio rendering. For example, a host processor of a wireless speaker may utilize packet transmission and/or reception times, e.g., as recorded by a network interface associated with the host processor, to determine an end-to-end propagation delay between the wireless speaker and the audio source device or another wireless speaker. The determined end-to-end propagation delay may then be used by the host processor of the wireless speaker to synchronize with the host processor of the audio source device and/or the other wireless speaker. However, the clock utilized by the network interface to record the packet reception and/or transmission times may not be synchronized with the clock of the host processor. Accordingly, the difference between the clocks of the network interface and the host processor may introduce error in the synchronization between the devices if the difference between the clocks is not accounted for.

The subject inter-chip time synchronization system provides a solution to this problem by enabling the host processor and the associated network interface of a wireless device to determine a conversion parameter for converting between their respective clocks. Thus, using the subject system, the host processor can receive a packet time stamped by the network interface and can use the conversion parameter to convert the timestamp into the host processor clock's time. In this manner, the subject inter-chip time synchronization system can account for the differences between the clocks of the host processor and the network interface, and thereby can facilitate the tight inter-device synchronization that may be utilized in, e.g., a distributed audio system, to perform one or more operations that are tightly synchronized across multiple wireless devices, such as audio beamforming.

Figure 1:
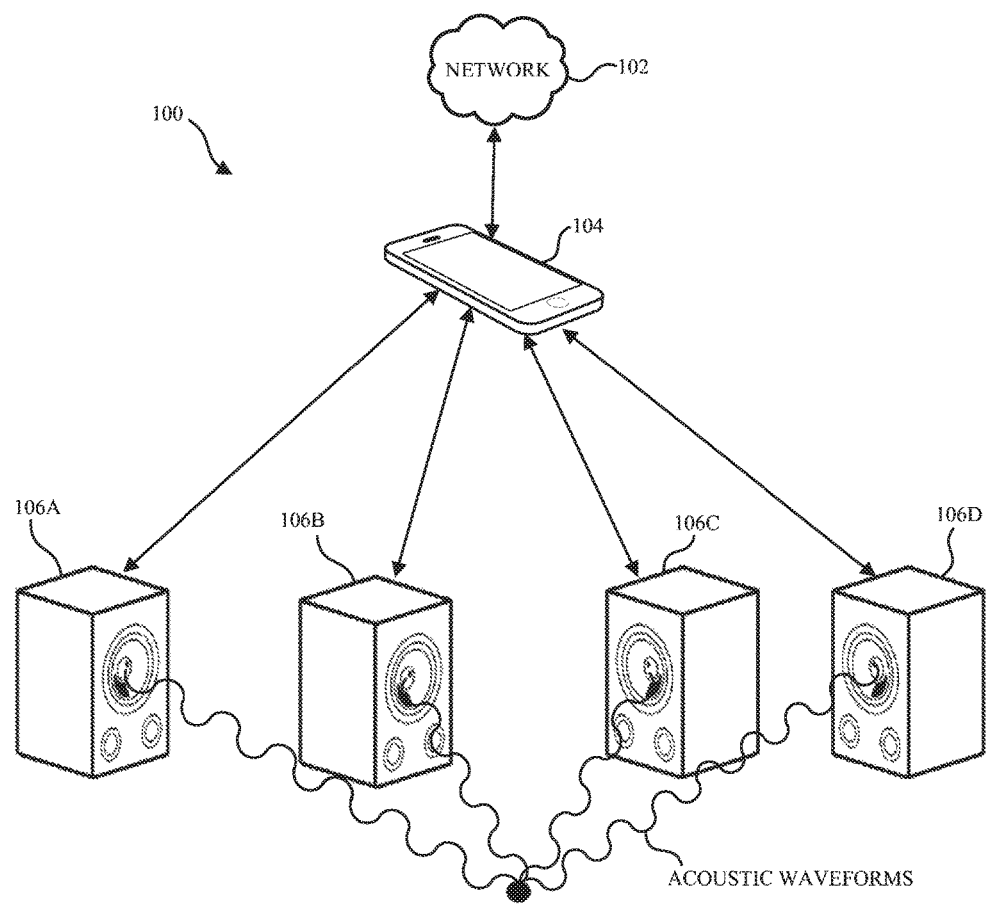
FIG. 1 illustrates an example network environment in which a device utilizing an inter-chip time synchronization system may be implemented in accordance with one or more implementations.

FIG. 1 illustrates an example network environment 100 in which a device utilizing an inter-chip time synchronization system may be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The network environment 100 includes one or more electronic devices 104, 106A-D and a network 102. The electronic devices 104, 106A-D may be computing devices such as laptop or desktop computers, smartphones, set-top boxes, peripheral devices (e.g., watches, digital cameras, speakers), user input devices, tablet devices, wireless routers (e.g., Wi-Fi access points), speakers, home automation devices, televisions or other displays with one or more processors coupled thereto and/or embedded therein, or other appropriate devices that include wireless network interfaces, such as wireless local area network (WLAN) radios, Bluetooth radios, and/or other wireless radios.

In FIG. 1, by way of example, the electronic device 104 is depicted as a tablet device and the electronic devices 106A-D are depicted as wireless speaker devices. One or more of the electronic devices 104, 106A-D may be, and/or may include all or part of, the electronic device discussed below with respect to FIG. 2 and/or the electronic system discussed below with respect to FIG. 8.

One or more of the electronic devices 104, 106A-D may include appropriate wireless (and/or wired) network interfaces for establishing direct, e.g. peer-to-peer, wireless network connections, such as Wi-Fi Direct connections, Bluetooth connections, or generally any wireless network connections, as well as wireless network connections through an intermediary device, such as a wireless access point, or through one or more of the other electronic devices 104, 106A-D. In FIG. 1, for explanatory purposes each of the electronic devices 106A-D is depicted as having a direct wireless network connection with the electronic device 104, such as in a star network topology. However, the electronic devices 104, 106A-D may be interconnected in generally any manner, such as a ring network topology, a mesh network topology, and/or generally any network topology.

In FIG. 1, the electronic device 104 is depicted as having a network connection with the network 102; however, one or more of the electronic devices 106A-D may also have an independent network connection with the network 102. The network 102 may be and/or may include a connected network of devices, such as the Internet. In one or more implementations, the electronic device 104 may be coupled to the network 102 via a different wired or wireless connection than the wireless (and/or wired) connection by which the electronic device 104 is coupled to the electronic devices 106A-D. For example, the electronic device 104 may be coupled to one or more of the electronic devices 106A-D via a Wi-Fi or Bluetooth network connection, and the electronic device 104 may be coupled to the network 102 via a cellular or Wi-Fi network connection.

For explanatory purposes, the electronic devices 104, 106A-D are depicted in FIG. 1 as part of a distributed wireless audio system implementing one or more operations that are synchronized across multiple of the electronic devices 104, 106A-D, such as audio beamforming. However, the electronic devices 104, 106A-D are not limited to a distributed wireless audio system. For example, one or more of the electronic devices 104, 106A-D may be a part or all of any distributed wireless system in which one or more operations are performed that are tightly synchronized across multiple of the electronic devices 104, 106A-D.

In one or more implementations, the electronic device 104 may operate as an audio source device and one or more of the electronic devices 106A-D may operate as audio sink devices, or audio output devices. However, the electronic device 104 may also operate as an audio output device and one or more of the electronic devices 106A-D may operate as an audio source device. When the electronic device 104 operates as the audio source device, the electronic device may receive audio data, such as audio packets, over the network 102, and/or the electronic device 104 may locally store audio data.

In order to implement audio beamforming amongst one or more of the electronic devices 106A-D, the electronic device 104 may determine the appropriate acoustic waveform to be output by one or more of the electronic devices 106A-D and the associated presentation timestamps that indicate the time at which the acoustic waveforms should be output by the respective electronic devices 106A-D. The electronic device 104 may transmit the audio data and the associated presentation timestamps to the respective electronic devices 106A-D. The electronic devices 106A-D receive the audio data and the associated timestamps and output the associated acoustic waveforms at the times indicated by the presentation timestamps. However, in order to implement the audio beamforming, the electronic devices 106A-D may need to be tightly synchronized when outputting the acoustic waveforms, such as synchronized to less than 5 milliseconds, within 5 milliseconds, less than 10 milliseconds, etc.

Accordingly, one or more of the electronic devices 104, 106A-D may implement the subject inter-chip time synchronization system to achieve the tight synchronization that may be required for the audio beamforming and/or other tightly synchronized operations. An example electronic device 106A implementing the subject system is discussed further below with respect to FIG. 2 and example processes of the subject system are discussed further below with respect to FIGS. 3-7.

Figure 2:
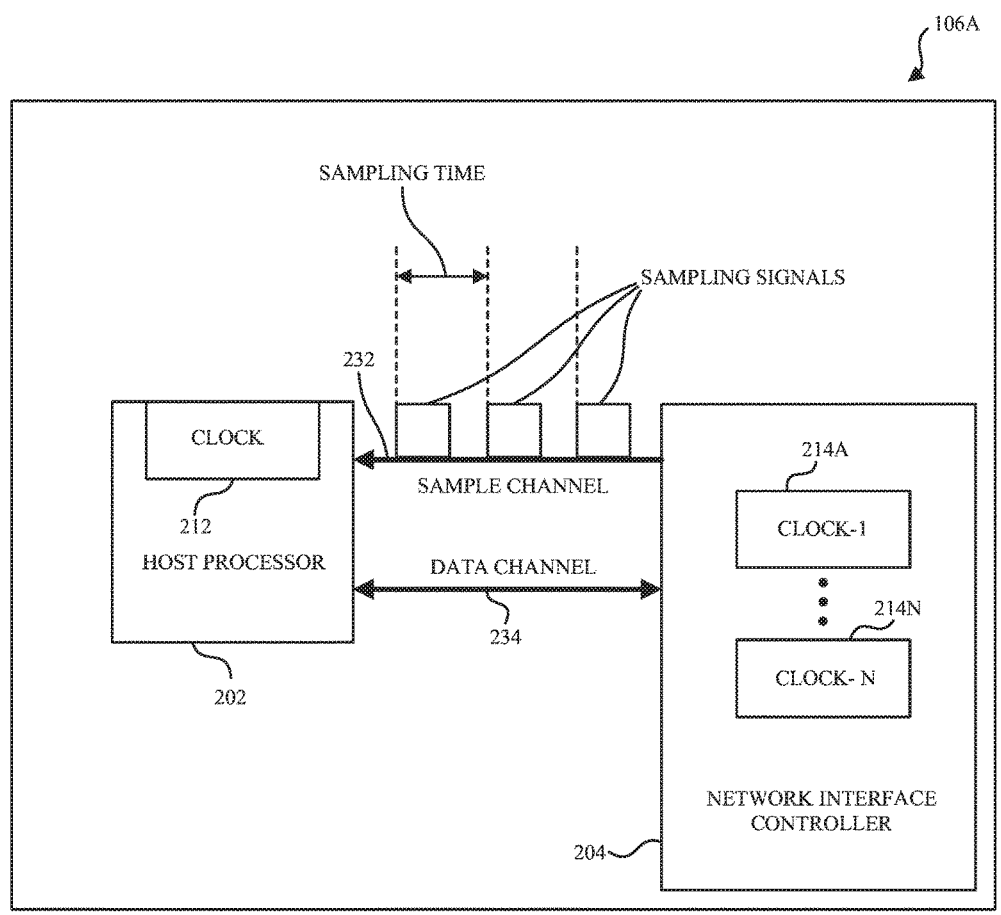
FIG. 2 illustrates an example device that may implement an inter-chip time synchronization system in accordance with one or more implementations.

FIG. 2 illustrates an example device 106A that may implement an inter-chip time synchronization system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided. In one or more implementations, one or more components of the example electronic device 106A may also be implemented by one or more of the other electronic devices 104, 106B-D.

The electronic device 106A may include a host processor 202, a network interface controller 204, such as a Wi-Fi chipset, a sample channel 232, such as a general-purpose input/output (GPIO) line, and a data channel 234, such as a Peripheral Component Interconnect (PCI) Express channel or any data bus. The host processor 202 may include a host processor clock 212, and the network interface controller 204 may include one or more network interface controller clocks 214A-N.

The host processor 202 may be coupled to the network interface controller by the data channel 234 as well as by the sample channel 232. In one or more implementations, one or more of the data channel 234 or the sample channel 232 may be a unidirectional channel or a bidirectional channel. In FIG. 2, the sample channel 232 is illustrated as being a unidirectional signal line from the network interface controller 204 to the host processor 202 and the data channel 234 is illustrated as being a bidirectional data channel between the host processor 202 and the network interface controller 204. However, in one or more implementations, the sample channel 232 may be a unidirectional signal line from the host processor 202 to the network interface controller 204. In one or more implementations, the sample channel 232 may be a signal line that may pass a high signal and a low signal, where the high signal or the low signal indicates a sampling period.

The host processor clock 212 and one or more of the network interface controller clocks 214A-N may be free running clocks that may be represented as counters. One or more of the network interface controller clocks 214A-N may be associated with a frequency that may indicate a precision, or resolution, of the one or more of the network interface controller clocks 214A-N, as well as the power consumption associated with the one or more of the network interface controller clocks 214A-N. For example, the network interface controller clock 214A may operate at a higher frequency than the network interface controller clock 214N, and therefore the network interface controller clock 214A may be more precise, have a higher resolution, and consume more power, than the network interface controller clock 214N.

In one or more implementations, the network interface controller 204 may dynamically activate one or more of the clocks 214A-N based on a precision level that may be associated with a current operation and/or application. For example, the network interface controller 204 may attempt conserve power by activating one of the network interface controller clocks 214A-N with the lowest frequency (and therefore lowest power consumption) that can be tolerated by a current operation or application being facilitated by the network interface controller 204. In one or more implementations, the host processor 202 may transmit an indication to the network interface controller 204 of the lowest precision that can be tolerated for a current application or operation and/or the host processor 202 may transmit an identifier, such as an index, of one of the network interface controller clocks 214A-N that the network interface controller 204 should use for capturing timestamps for received and/or transmitted packets. In one or more implementations, the network interface controller 204 may infer the lowest precision that can be tolerated by determining the type of packets being transmitted, e.g. audio packets, data packets, etc., such as by performing a packet inspection. In order to conserve power, the network interface controller 204 may power down any of the network interface controller clocks 214A-N that are not in use.

The host processor 202 may transmit packets over the data channel 234 to the network interface controller 204 for transmission by the network interface controller 204, such as to one of the other electronic devices 104, 106B-D, and/or over the network 102. In one or more implementations, the data channel 234 may be associated with a non-deterministic delay such that the host processor 202 may be unable to determine precisely when the network interface controller 204 has transmitted a given packet that was transmitted over the data channel 234. Thus, the network interface controller 204 may generate a timestamp for the transmitted packet, such as from one or more of the network interface controller clocks 214A-N. The network interface controller 204 may then generate a transmission complete packet that includes an identifier of the transmitted packet, such as a sequence number, and the generated timestamp, and the network interface controller 204 may transmit the transmission complete packet back to the host processor 202, such as over the data channel 234. In this manner, the host processor 202 can identify precisely when the packet was transmitted by the network interface controller 204, irrespective of any non-deterministic delay associated with the data channel 234.

The network interface controller 204 may also receive a packet, such as from one of the other electronic devices 104, 106B-D and/or over the network 102. The network interface controller 204 may generate a timestamp for the received packet, such as using one or more of the network interface controller clocks 214A-N, may append the generated timestamp to the packet, and may pass the received packet with the appended timestamp to the host processor 202 over the data channel 234. In this manner, the host processor 202 can identify precisely when the packet was received by the network interface controller 204, irrespective of any non-deterministic delay associated with the data channel 234.

Since the host processor clock 212 and the one or more network interface controller clocks 214A-N may be free running and/or uncoordinated, the host processor 202 and the network interface controller 204 may implement the subject inter-chip time synchronization system such that the host processor 202 can translate the timestamps captured from one or more of the network interface controller clocks 214A-N for the transmitted and/or received packets to the time of the host processor clock 212. In one or more implementations, the subject inter-chip time synchronization system may be performed when the electronic device 106A is powered on, may be performed at periodic and/or aperiodic intervals, and/or may generally be performed at any time.

The subject inter-chip time synchronization system enables the host processor 202 and/or the network interface controller 204 to determine one or more conversion parameters between one or more of the network interface controller clocks 214A-N of the network interface controller 204 and the host processor clock 212 of the host processor 202. In this manner, a timestamp captured by one of the network interface controller clocks 214A-N can be converted to the time of the host processor clock 212, such that the host processor 202 can precisely determine when a packet was received and/or transmitted by the network interface controller 204, such as to determine a time of flight estimation and/or a propagation delay estimation between the electronic device 106A and one or more of the other electronic devices 104, 106B-D.

For example, the host processor 202 and the network interface controller 204 may utilize the sample channel 232 to synchronize capturing timestamps at sampling intervals from the host processor clock 212 and one or more of the network interface controller clocks 214A-N. The network interface controller 204 may transmit its captured timestamps over the data channel 234 to the host processor 202, and the host processor 202 may use the captured timestamps to generate one or more conversion parameters between the host processor clock 212 and one or more of the network interface controller clocks 214A-N. An example process for generating one or more conversion parameters by the host processor 202 is discussed further below with respect to FIG. 3.

In one or more implementations, the generation of the conversion parameters may be offloaded to the network interface controller 204 (and/or another circuit). Thus, the host processor 202 may transmit its captured timestamps over the data channel 234 to the network interface controller 204, and the network interface controller 204 may use the captured timestamps to generate the one or more conversion parameters. An example process for generating one or more conversion parameters by the network interface controller 204 is discussed further below with respect to FIG. 4. In one or more implementations, the host processor 202 and the network interface controller 204 may exchange captured timestamps over the data channel 234 regardless of which circuit is generating the conversion parameters.

After generating the one or more conversion parameters, the network interface controller 204 may capture a timestamp using one or more of the network interface controller clocks 214A-N, such as the network interface controller clock 214A, and the network interface controller 204 may append the captured timestamp, as well as an identifier of the network interface controller clock 214A to the received packet. The network interface controller 204 may then pass the received packet, including the appended information, over the data channel 234 to the host processor 202. The host processor 202 may use a generated conversion parameter associated with the identified network interface controller clock 214A to convert the timestamp to the time of the host processor clock 212. An example process of converting, by the host processor 202, a captured timestamp to the time of the host processor clock 212 is discussed further below with respect to FIG. 6.

In one or more implementations, the conversion of the timestamps may be offloaded to the network interface controller 204 (and/or another circuit) such that the network interface controller 204 converts a captured timestamp to the time of the host processor clock 212, appends the converted timestamp to the packet, and transmits the packet to the host processor 202 over the data channel 234. An example process of converting, by the network interface controller 204, a captured timestamp to the time of the host processor clock 212 is discussed further below with respect to FIG. 5. The timestamp conversion may also be performed by the host processor 202 and/or the network interface controller 204 for the transmitted timestamps included in the transmission complete packets, as is discussed further below with respect to FIG. 7.

In one or more implementations, one or more of the host processor 202, the network interface controller 204, the host processor clock 212, one or more of the network interface controller clocks 214A-N, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
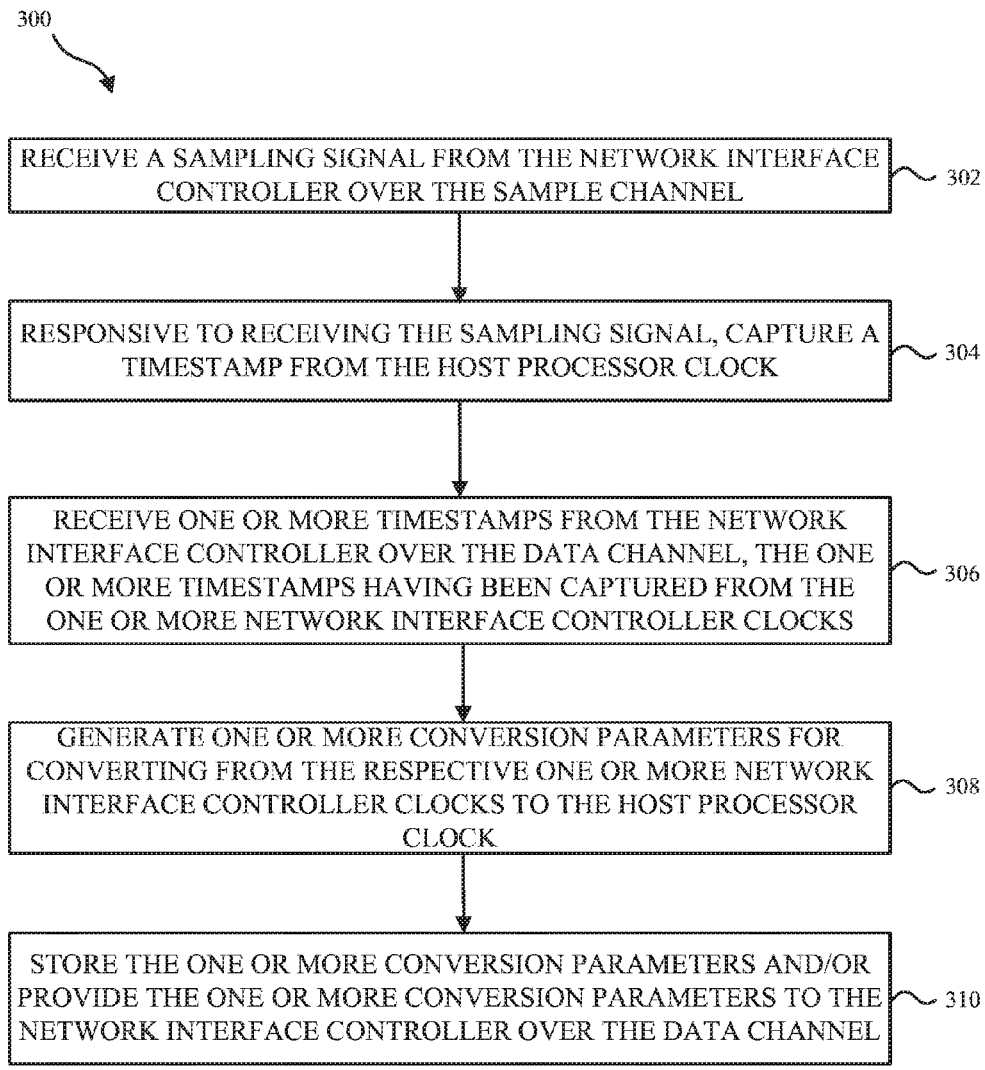
FIG. 3 illustrates a flow diagram of an example process for generating a conversion parameter by a host processor in an inter-chip time synchronization system in accordance with one or more implementations.

FIG. 3 illustrates a flow diagram of an example process 300 for generating a conversion parameter by a host processor 202 in an inter-chip time synchronization system in accordance with one or more implementations. For explanatory purposes, the example process 300 is primarily described herein with reference to the host processor 202 and the network interface controller 204 of the electronic device 106A of FIGS. 1 and 2. However, the example process 300 is not limited to the host processor 202 and the network interface controller 204 of the electronic device 106A of FIGS. 1 and 2. For example, the example process 300 may be implemented by any two circuits, such as any two circuits collocated within a device, and one or more blocks of the example process 300 may be performed by one or more components of the electronic device 106A. Further for explanatory purposes, the blocks of the example process 300 are described herein as occurring in serial, or linearly. However, multiple blocks of the example process 300 may occur in parallel. In addition, the blocks of the example process 300 need not be performed in the order shown and/or one or more of the blocks of the example process 300 need not be performed.

In the example process 300 for generating one or more conversion parameters by the host processor 202, the host processor 202 receives a sampling signal from the network interface controller 204 over the sample channel 232 (302). For example, the network interface controller 204 may pass a high signal over the sample channel 232 as the sampling signal. The host processor 202, responsive to receiving/detecting the sampling signal on the sample channel 232, substantially simultaneously captures a timestamp from the host processor clock 212 (304). In one or more implementations, the propagation delay of the sampling signal over the sample channel 232 may be negligible and/or may be sufficiently small to not introduce error into the inter-chip synchronization.

In one or more implementations, the host processor 202 may repeat the receiving (302) and the capturing (304) and transmitting (304) any number of times, such as to generate a sufficiently large sample size for determining one or more conversion parameters for converting one or more of the network interface controller clocks 214A-N to the time of the host processor clock 212. For example, when conversion parameters are being determined concurrently for multiple of the network interface controller clocks 214A-N, the sample size may be related to a precision of the least precise one of the network controller clocks 214A-N from which a timestamp is being captured, such as inversely proportional to the precision of the least precise one of the network controller clocks 214A-N. In this manner, the sample size may be sufficiently large enough to smooth variations/fluctuations in the least precise one of the network controller clocks 214A-N for which the conversion parameters are being concurrently determined. In one or more implementations, the sample size may be pre-configured for one or more of the network controller clocks 214A-N.

After performing the receiving (302) and capturing (304) once, or any number of times, the host processor 202 receives, from the network interface controller 204 over the data channel 234, one or more timestamps captured from the one or more network interface controller clocks 214A-N by the network interface controller 204 for the sampling period(s) (306). In one or more implementations, the one or more timestamps may be received from the network interface controller 204 on a pre-configured periodic or an aperiodic basis, and/or upon being requested by the host processor 202. The one or more timestamps may have been captured by the network interface controller 204 from one or more of the network interface controller clocks 214A-N substantially simultaneous to the timestamp being captured by the host processor 202 from the host processor clock 212 for the sampling period(s) (304).

If the received one or more timestamps correspond to multiple of the network interface controller clocks 214A-N, each of the timestamps may be associated with an identifier, such as an index, of the one of the network interface controller clocks 214A-N from which the timestamp was captured. Furthermore, if the received one or more timestamps (304) correspond to multiple sampling periods, the timestamps may also be indexed based at least in part in the order in which the timestamps were captured. In one or more implementations, the host processor 202 may also transmit the one or more timestamps captured from the host processor clock 212 (304) over the data channel 234 to the network interface controller 204.

The host processor 202 generates one or more conversion parameters for converting a timestamp captured from each of the respective one or more network interface controller clocks 214A-N to the time of the host processor clock 212 based at least in part on the captured timestamps (308). In one or more implementations, the one or more conversion parameters may be generated by performing, for each of the respective one or more network interface controller clocks 214A-N, such as the network interface controller clock 214A, a linear regression (and/or any regression analysis) using the one or more timestamps captured from the host processor clock 212, and the temporally coincident one or more timestamps captured from the network interface controller clock 214A, to determine a linear relationship between the respective timestamps captured from the clocks 212, 214A. In this instance, the conversion parameters may be the slope (m) and the y-intercept (b) of the linear relationship between the timestamps. The linear relationship may include a standard deviation associated with drifts and/or lags due to environmental variability (e.g., thermal drifts), jitter in the clocks, differences between the sampling time and each of the individual clocks 212, 214A, and/or other factors.

Upon generating the one or more conversion parameters for each of the respective one or more network interface controller clocks 214A-N, the host processor 202 may store the one or more conversion parameters, such as in an on-chip or off-chip memory, and/or may transmit the one or more conversion parameters to the network interface controller 204 over the data channel 234 (310). If the host processor 202 generated one or more conversion parameters for multiple of the one or more network interface controller clocks 214A-N, each of the conversion parameters may be associated with an identifier of the corresponding one of the network interface controller clocks 214A-N, such as an index associated with the one of the network interface controller clocks 214A-N. In one or more implementations, the host processor 202 may then use the conversion parameters to convert a timestamp of a received packet that was captured from any of the network interface controller clocks 214A-N to the time of the host processor clock 212, as is discussed further below with respect to FIG. 5, or to convert a timestamp of a transmission complete packet captured from any of the network interface controller clocks 214A-N to the time of the host processor clock 212, as is discussed further below with respect to FIG. 7.

Figure 4:
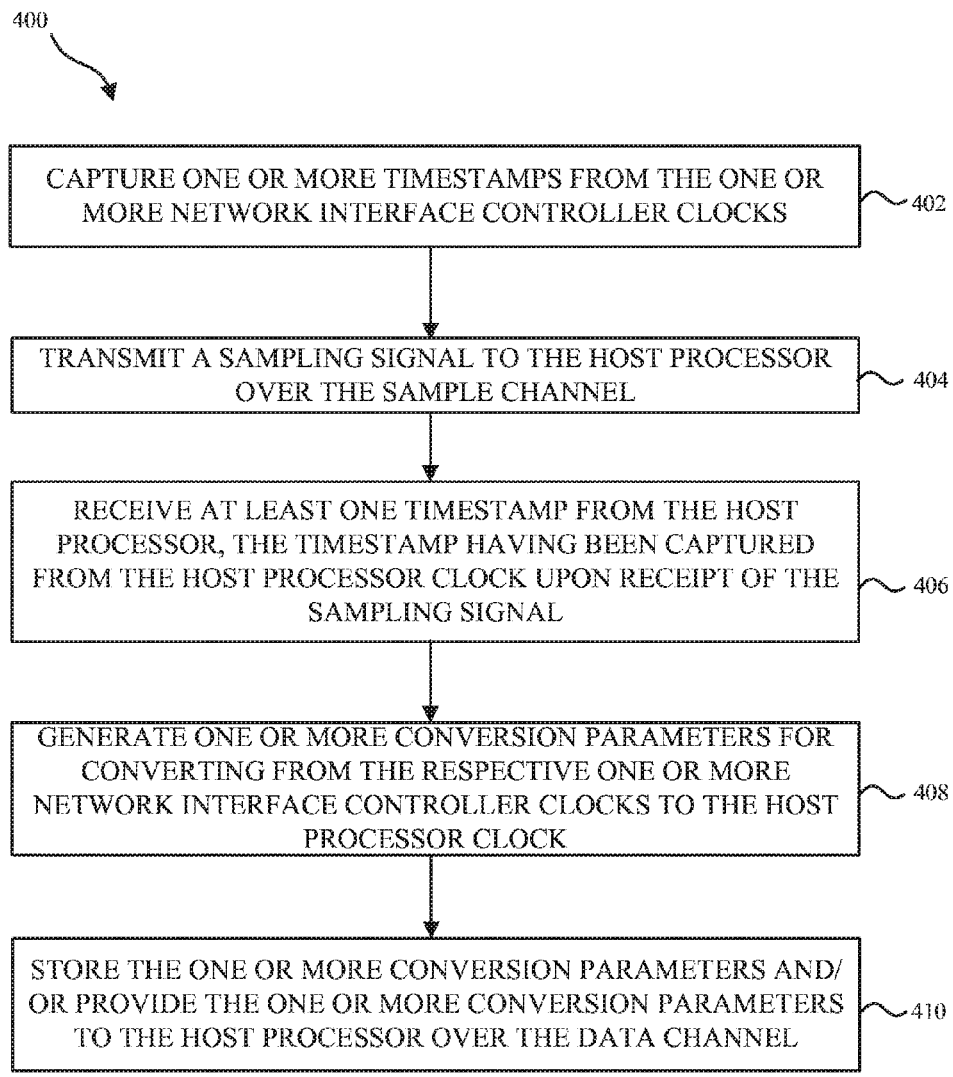
FIG. 4 illustrates a flow diagram of an example process for generating a conversion parameter by a network interface controller in an inter-chip time synchronization system in accordance with one or more implementations.

FIG. 4 illustrates a flow diagram of an example process 400 for generating a conversion parameter by the network interface controller 204 in an inter-chip time synchronization system in accordance with one or more implementations. For explanatory purposes, the example process 400 is primarily described herein with reference to the host processor 202 and the network interface controller 204 of the electronic device 106A of FIGS. 1 and 2. However, the example process 400 is not limited to the host processor 202 and the network interface controller 204 of the electronic device 106A of FIGS. 1 and 2. For example, the example process 400 may be implemented by any two circuits, such as any two circuits collocated within a device, and one or more blocks of the example process 400 may be performed by one or more components of the electronic device 106A. Further for explanatory purposes, the blocks of the example process 400 are described herein as occurring in serial, or linearly. However, multiple blocks of the example process 400 may occur in parallel. In addition, the blocks of the example process 400 need not be performed in the order shown and/or one or more of the blocks of the example process 400 need not be performed.

In the example process 400 for generating one or more conversion parameters by the network interface controller 204, the network interface controller 204 captures one or more timestamps from one or more of the network interface controller clocks 214A-N at a sampling period (402). In one or more implementations, the network interface controller 204 may capture a timestamp from one of the network controller clocks 214A-N, or from any number of the network controller clocks 214A-N, such as from the currently activated network controller clocks 214A-N. At substantially the same time, the network interface controller 204, transmits a sampling signal to the host processor 202 over the sampling channel 232 (404). The host processor 202 substantially simultaneously receives the sampling signal and captures a timestamp from the host processor clock 212 for the sampling period, as is discussed above with respect to FIG. 3.

In one or more implementations, the network interface controller 204 may repeat the capturing (402) and transmitting (404) any number of times, such as to generate a sufficiently large sample size for determining one or more conversion parameters for one or more of the network interface controller clocks 214A-N to the time of the host processor clock 212. After performing the capturing (402) and transmitting (404) once, or any number of times, the network interface controller 204 receives at least one timestamp from the host processor 202 over the data channel 234 (406). The at least one timestamp may have been captured by the host processor 202 from the host processor clock 212 upon receipt of the sampling signal transmitted by the network interface controller 204 (404). If the network interface controller 204 transmitted multiple sampling signals (404), the host processor 202 may transmit a timestamp captured upon receipt of each of the sampling signals. In one or more implementations, the timestamps may be indexed based at least in part in the order in which the timestamps were captured by the host processor 202. In one or more implementations, the network interface controller 204 may also transmit the one or more timestamps captured from the one or more network interface controller clocks 214A-N over the data channel 234 to the host processor 202.

The network interface controller 204 generates one or more conversion parameters for converting a timestamp captured from the respective one or more network interface controller clocks 214A-N to the time of the host processor clock 212 based at least in part on the captured timestamps (408). In one or more implementations, the one or more conversion parameters may be generated in the same manner as is discussed above for the host processor 202 with respect to FIG. 3.

Upon generating the one or more conversion parameters, the network interface controller 204 may store the one or more conversion parameters, such as in an on-chip or off-chip memory, and/or may transmit the one or more conversion parameters to the host processor 202 over the data channel 234 (410). If the network interface controller 204 generated a conversion parameter for multiple of the network interface controller clocks 214A-N, each of the conversion parameters may be associated with an identifier of the corresponding one of the network interface controller clocks 214A-N, such as an index associated with the one of the network interface controller clocks 214A-N. In one or more implementations, the network interface controller 204 may then use the conversion parameters to convert a timestamp captured from any of the network interface controller clocks 214A-N for a received packet to the time of the host processor clock 212, as is discussed further below with respect to FIG. 6, or to convert a timestamp captured from any of the network interface controller clocks 214A-N for a transmitted packet to the time of the host processor clock 212, as is discussed further below with respect to FIG. 7.

Figure 5:
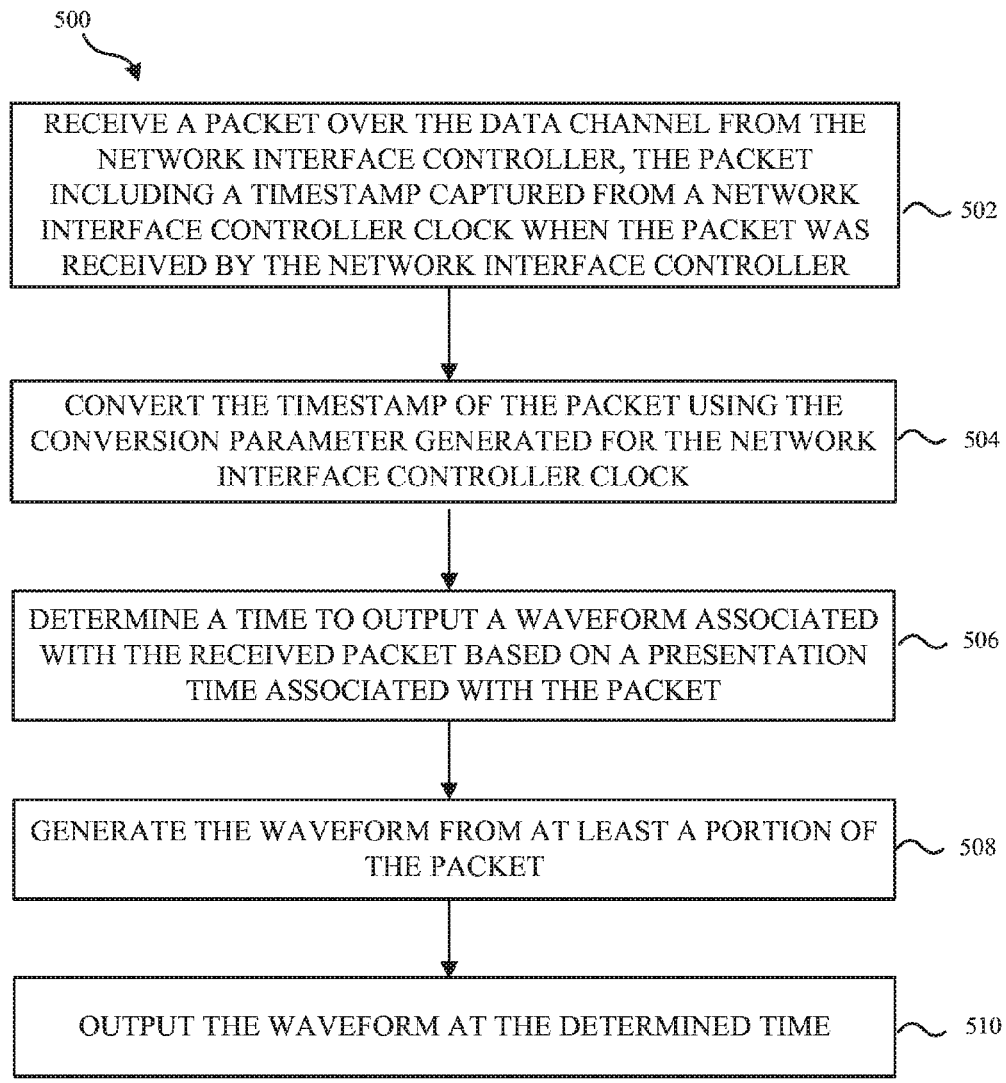
FIG. 5 illustrates a flow diagram of an example process for converting, by a host processor, a captured timestamp for a received packet in an inter-chip time synchronization system in accordance with one or more implementations.

FIG. 5 illustrates a flow diagram of an example process 500 for converting, by a host processor 202, a captured timestamp for a received packet in an inter-chip time synchronization system in accordance with one or more implementations. For explanatory purposes, the example process 500 is primarily described herein with reference to the host processor 202 and the network interface controller 204 of the electronic device 106A of FIGS. 1 and 2 implementing a distributed wireless audio system. However, the example process 500 is not limited to the host processor 202 and the network interface controller 204 of the electronic device 106A of FIGS. 1 and 2, and/or a distributed wireless audio system. For example, the example process 500 may be implemented by any two circuits, such as any two circuits collocated within a device, and one or more blocks of the example process 500 may be performed by one or more components of the electronic device 106A. Further for explanatory purposes, the blocks of the example process 500 are described herein as occurring in serial, or linearly. However, multiple blocks of the example process 500 may occur in parallel. In addition, the blocks of the example process 500 need not be performed in the order shown and/or one or more of the blocks of the example process 500 need not be performed.

In the example process 500 for converting, by the host processor 202, a captured timestamp for a received packet, the host processor 202 may receive a packet over the data channel 234 from the network interface controller 204 (502). The packet may include a timestamp captured by the network interface controller 204 from any of the network interface controller clocks 214A-N, such as the network interface controller clock 214A, at the time that the packet was received by the network interface controller 204. As previously discussed, the network interface controller clock 214A used by the network interface controller 204 to capture the timestamp may be dynamically configurable by the host processor 202 and/or the network interface controller 204. In one or more implementations, the packet may further include an identifier, such as an index, corresponding to the network interface controller clock 214A used to capture the timestamp such that the host processor 202 can determine the one or more conversion parameters associated with the network interface controller clock 214A.

The host processor 202 retrieves the one or more conversion parameters associated with the network interface controller clock 214A, such as from on-chip and/or off-chip memory, and converts the timestamp of the received packet to the time of the host processor clock 212 using the conversion parameter (504). In one or more implementation, the host processor 202 may be participating in, for example, a distributed wireless audio system, and the host processor 202 may determine a time to output a waveform, such as an audio/acoustic waveform, associated with the received packet based at least in part on a presentation time associated with the packet (506). In one or more implementations, the presentation time may be included in the received packet and the presentation time may be in the time of the host processor clock 212. For example, the host processor 202 may have previously utilized the subject system for inter-chip time synchronization to perform an inter-device synchronization (e.g., utilizing a time of flight estimation and/or propagation delay estimation) with another device, such as the electronic device 104. Thus, in one or more implementations, the host processor clock 212 may be synchronized with, and/or convertible to, a clock of the electronic device 104.

The host processor 202 may then generate the waveform from at least a portion of the received packet and/or one or more other packets (508), and output the waveform, such as an audio/acoustic waveform, to a driver circuit, such as in a speaker, at the determined time (510). In one or more implementations, the output of the waveform may be synchronized with the output of a waveform by one or more of the other electronic devices 104, 106B-D, such as to implement audio beamforming.

Figure 6:
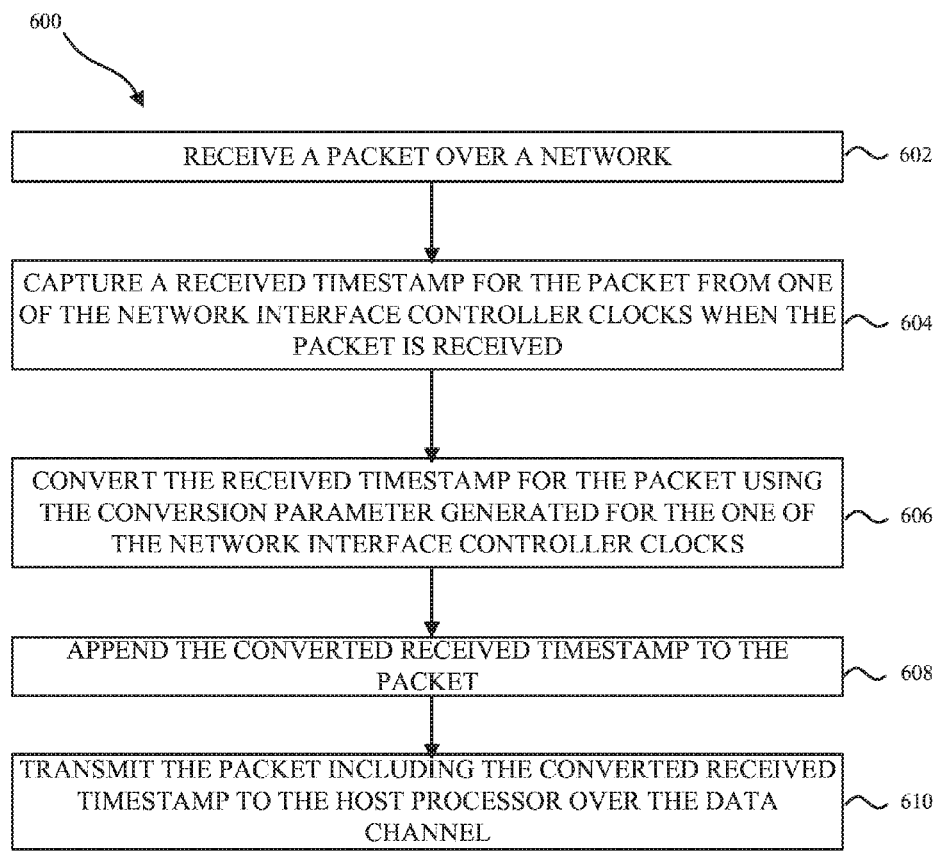
FIG. 6 illustrates a flow diagram of an example process for converting, by a network interface controller, a captured timestamp for a received packet in an inter-chip time synchronization system in accordance with one or more implementations.

FIG. 6 illustrates a flow diagram of an example process 600 for converting, by a network interface controller 204, a captured timestamp for a received packet in an inter-chip time synchronization system in accordance with one or more implementations. For explanatory purposes, the example process 600 is primarily described herein with reference to the host processor 202 and the network interface controller 204 of the electronic device 106A of FIGS. 1 and 2. However, the example process 600 is not limited to the host processor 202 and the network interface controller 204 of the electronic device 106A of FIGS. 1 and 2. For example, the example process 600 may be implemented by any two circuits, such as any two circuits collocated within a device, and one or more blocks of the example process 600 may be performed by one or more components of the electronic device 106A. Further for explanatory purposes, the blocks of the example process 600 are described herein as occurring in serial, or linearly. However, multiple blocks of the example process 600 may occur in parallel. In addition, the blocks of the example process 600 need not be performed in the order shown and/or one or more of the blocks of the example process 600 need not be performed.

In the example process 600 for converting, by the network interface controller 204 a captured timestamp for a received packet, the network interface controller 204 receives a packet, such as over the network 102 and/or from one of the electronic devices 104, 106B-D (602). The network interface controller 204 captures a timestamp from any of the network interface controller clocks 214A-N, such as the network interface controller clock 214A, at the time that the packet is received (604). As previously discussed, the network interface controller clock 214A used by the network interface controller 204 to capture the timestamp may be dynamically configurable by the host processor 202 and/or the network interface controller 204.

The network interface controller 204 retrieves the one or more conversion parameters associated with the network interface controller clock 214A, such as from on-chip and/or off-chip memory, and converts the timestamp of the received packet to the time of the host processor clock 212 using the conversion parameter (606). The network interface controller 204 may then append the converted timestamp to the received packet (608) and transmit the packet including the converted timestamp over the data channel 234 to the host processor 202 (610). In one or more implementations, the network interface controller 204 may further append to the packet an indication that the timestamp has been converted to the time of the host processor clock 212 (the host processor clock time), such that the host processor 202 is aware that the timestamp has already been converted.

Figure 7:
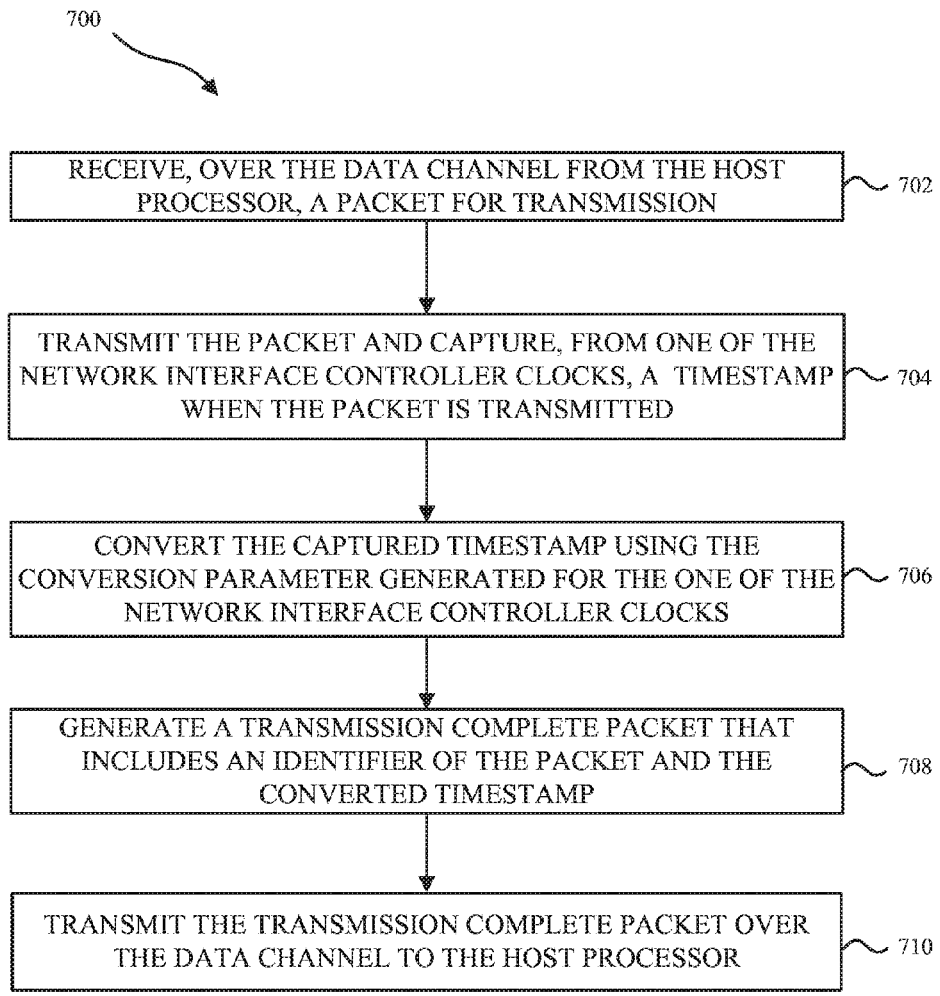
FIG. 7 illustrates a flow diagram of an example process for converting a captured timestamp for a transmitted packet in an inter-chip time synchronization system in accordance with one or more implementations.

FIG. 7 illustrates a flow diagram of an example process 700 for converting a captured timestamp for a transmitted packet in an inter-chip time synchronization system in accordance with one or more implementations. For explanatory purposes, the example process 700 is primarily described herein with reference to the host processor 202 and the network interface controller 204 of the electronic device 106A of FIGS. 1 and 2. However, the example process 700 is not limited to the host processor 202 and the network interface controller 204 of the electronic device 106A of FIGS. 1 and 2. For example, the example process 700 may be implemented by any two circuits, such as any two circuits collocated within a device, and one or more blocks of the example process 500 may be performed by one or more components of the electronic device 106A. Further for explanatory purposes, the blocks of the example process 700 are described herein as occurring in serial, or linearly. However, multiple blocks of the example process 700 may occur in parallel. In addition, the blocks of the example process 700 need not be performed in the order shown and/or one or more of the blocks of the example process 700 need not be performed.

In the example process 700 for converting a captured timestamp for a transmitted packet, the network interface controller 204 receives, over the data channel 234 from the host processor 202, a packet for transmission, such as for transmission over the network 102 and/or to one or more of the electronic devices 104, 106B-D (702). The network interface controller 204 transmits the packet, such as over the network 102, and substantially simultaneously captures, from one of the network interface controller clocks 214A-N, such as the network interface controller clock 214A, a timestamp at the time that the packet is transmitted (704).

The network interface controller 204 converts the captured timestamp using the conversion parameter generated for the network interface controller clock 214A (706). The network interface controller 204 generates a transmission complete packet that includes an identifier of the transmitted packet, such as a sequence number of the transmitted packet, and the converted timestamp (708). In one or more implementations, the transmission complete packet may further include an indication that the transmitted timestamp has been converted into the time of the host processor clock 212. The network interface controller 204 transmits the transmission complete packet over the data channel 234 to the host processor 202 (710). In this manner, the host processor 202 can determine the precise time that the packet was transmitted, such as for performing a time of flight estimation with respect to another of the electronic devices 104, 106B-D.

In one or more implementations, the network interface controller 204 may not convert the transmitted timestamp and may instead include, in the transmission complete packet, the captured timestamp along with an identifier, such as an index, of the network interface controller clock 214A that captured the transmitted timestamp. In this manner, the host processor 202 can determine, based on the included identifier, the conversion parameter associated with the network interface controller clock 214A, and the host processor 202 can convert the timestamp to the time of the host processor clock 212.

Figure 8:
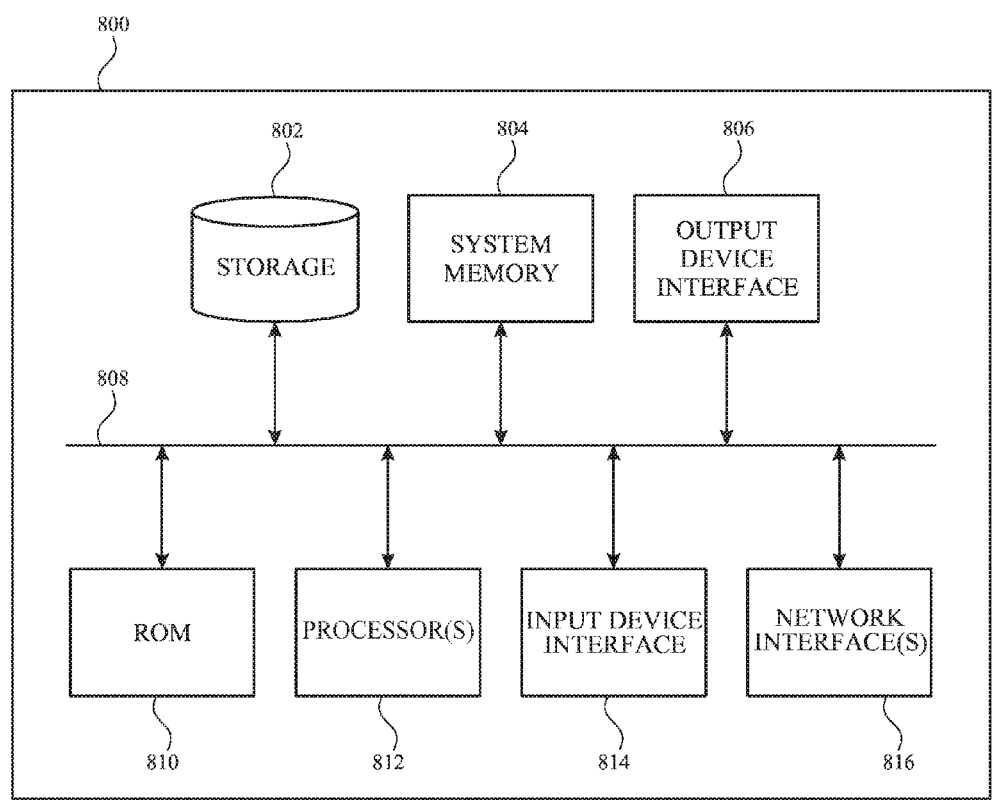
FIG. 8 conceptually illustrates an example electronic system with which one or more implementations of the subject technology may be implemented.

FIG. 8 conceptually illustrates an electronic system 800 with which one or more implementations of the subject technology may be implemented. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The electronic system 800, in one or more implementations, may be, or may be coupled to, an audio output device, such as a speaker, a desktop computer, a laptop computer, a tablet computer, a server, a switch, a router, a base station, a receiver, a phone, a tablet device, or generally any electronic device that transmits signals over a network. The electronic system 800 can be, and/or can be a part of, one or more of the electronic devices 104, 106A-D. The electronic system 800 may include various types of computer readable media and interfaces for various other types of computer readable media. The electronic system 800 includes a bus 808, one or more processor(s) 812, a system memory 804 or buffer, a read-only memory (ROM) 810, a permanent storage device 802, an input device interface 814, an output device interface 806, and one or more network interface(s) 816, or subsets and variations thereof.

The bus 808 collectively represents all system, peripheral, and chipset buses that communicatively connect the numerous internal devices of the electronic system 800. In one or more implementations, the bus 808 communicatively connects the one or more processor(s) 812 with the ROM 810, the system memory 804, and the permanent storage device 802. From these various memory units, the one or more processor(s) 812 may retrieve instructions to execute and data to process in order to execute the processes of the subject disclosure. In one or more implementations, the one or more processor(s) 812 can be a single processor or a multi-core processor in different implementations.

The ROM 810 stores static data and instructions that are needed by the one or more processor(s) 812 and/or other modules of the electronic system 800. The permanent storage device 802 may be a read-and-write memory device. In one or more implementations, the permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. The system memory 804 may be a read-and-write memory device. However, unlike the permanent storage device 802, the system memory 804 may be a volatile read-and-write memory, such as random access memory. The system memory 804 may store any of the instructions and data that the one or more processor(s) 812 may need at runtime. In one or more implementations, the processes of the subject disclosure are stored in the system memory 804, the permanent storage device 802, and/or the ROM 810. From these various memory units, the one or more processor(s) 812 retrieve instructions to execute and data to process in order to execute the processes of one or more implementations.

The bus 808 also connects to the input and/or output device interfaces 814 and 806. The input device interface 814 enables a user to communicate information and select commands to the electronic system 800. In one or more implementations, input devices that may be used with the input device interface 814 may include, for example, alphanumeric keyboards, touch interfaces, such as touchscreens, and/or pointing devices (also called "cursor control devices").

The output device interface 806 may enable, in one or more implementations, the display of images generated by the electronic system 800. In one or more implementations, output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 8, the bus 808 may also couples the electronic system 800 to one or more networks (not shown) through the one or more network interface(s) 816. The one or more network interface(s) 816 may include an Ethernet interface, a Wi-Fi interface, a cellular interface, a millimeter Wave (mmWave) interface, a reduced gigabit media independent interface (RGMII), or generally any interface for connecting to a network. The one or more network interface(s) 816 may include, or may be coupled to, a physical layer module. In this manner, the electronic system 800 may be a part of one or more networks of computers (such as a local area network ("LAN"), a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory. FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed: rather, the phrase allows a meaning that includes at least one of any one of the items, and/or at least one of any combination of the items, and/or at least one of each of the items. By way of example, the phrases "at least one of A, B. and C" or "at least one of A, B. or C" each refer to only A, only B, or only C; any combination of A, B, and C; and/or at least one of each of A. B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include". "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
   a first circuit comprising a first clock, the first circuit being communicatively coupled to a second circuit, wherein the first circuit is configured to:
   receive a plurality of sampling signals from the second circuit;
   capture a plurality of first timestamps from the first clock, each respective first timestamp of the plurality of first timestamps being captured upon receipt of a respective one of the plurality of sampling signals;
   receive a plurality of second timestamps from the second circuit, each respective second timestamp of the plurality of second timestamps having been captured by the second circuit from a second clock upon transmission of a respective one of the plurality of sampling signals to the first circuit;
   generate a first conversion parameter for converting from the second clock of the second circuit to the first clock of the first circuit based at least in part on the plurality of first timestamps and the plurality of second timestamps; and
   store the first conversion parameter.

2. The device of claim 1, wherein the first circuit comprises a host processor and the second circuit comprises a network interface controller.

3. The device of claim 1, wherein the first circuit is communicatively coupled to the second circuit via a sampling channel and a data channel, the plurality of sampling signals are received from the second circuit over the sampling channel, and the plurality of second timestamps are received from the second circuit over the data channel.

4. The device of claim 1, wherein the first circuit is further configured to:
   receive a packet from the second circuit, the packet comprising a received timestamp captured from the second clock and a presentation timestamp;
   convert the received timestamp based at least in part on the stored first conversion parameter;
   generate a waveform based at least in part on the packet; and
   provide the waveform for output in accordance with a time corresponding to the presentation timestamp.

5. The device of claim 1, wherein the first circuit is further configured to:
   transmit a packet to the second circuit for transmission over a network;
   receive a transmission complete packet from the second circuit, the transmission complete packet comprising a transmitted timestamp corresponding to the transmitted packet; and
   convert the transmitted timestamp for the packet based at least in part on the stored first conversion parameter.

6. The device of claim 1, wherein the first circuit is further configured to:
   receive a plurality of third timestamps from the second circuit, each of the plurality of third timestamps having been captured based on a third clock of the second circuit upon transmission of one of the plurality of sampling signals to the first circuit;
   generate a second conversion parameter for converting from the third clock of the second circuit to the first clock of the first circuit; and
   transmit an indication to the second circuit of one of the first or second clocks to be used for capturing timestamps.

7. A method comprising:
   capturing, by a first circuit having a first clock, a first timestamp responsive to receiving a sampling signal from a second circuit;
   receiving, by the first circuit from the second circuit, a second timestamp captured by the second circuit from a second clock, the second timestamp having been captured when the sampling signal was transmitted to the first circuit;

generating, by the first circuit, a first conversion parameter for converting from the second clock to the first clock;

storing, by the first circuit, the first conversion parameter;

receiving, by the first circuit, a packet from the second circuit, the packet including a received timestamp captured from the second clock; and converting, by the first circuit, the received timestamp based at least in part on the first conversion parameter.

8. The method of claim 7, wherein the first circuit comprises a host processor, the second circuit comprises a network interface controller, and the first and second circuits are collocated within a device.

9. The method of claim 7, further comprising:
transmitting, by the first circuit to the second circuit, a packet for transmission over a network;
receiving, by the first circuit from the second circuit, a transmission complete packet that includes a transmitted timestamp captured by the second circuit from the second clock when the packet was transmitted over the network by the second circuit; and
converting, by the first circuit, the transmitted timestamp based at least in part on the first conversion parameter.

10. The method of claim 7, further comprising:
receiving, by the first circuit from the second circuit, a third timestamp that was captured, by the second circuit, from a third clock of the second circuit, the third timestamp having been captured when the sampling signal was transmitted to the first circuit;
generating, by the first circuit, a second conversion parameter for converting from the third clock to the first clock based at least in part on the first timestamp and the third timestamp;
selecting, by the first circuit, one of the second or third clocks of the second circuit for capturing timestamps for packets based at least in part on a level of precision associated with the packets;
transmitting, by the first circuit to the second circuit, an indication of the selected one of the second or third clocks;
receiving, by the first circuit from the second circuit, a packet comprising a received timestamp and an identifier of the selected one of the second or third clocks; and
converting, by the first circuit, the received timestamp based at least in part on the first or second conversion parameter that corresponds to the selected one of the second or third clocks.

11. The method of claim 7, wherein the first circuit is communicatively coupled to the second circuit via a sampling channel and a data channel, the sampling signal is received from the second circuit over the sampling channel, and the second timestamp is received from the second circuit over the data channel.

12. The device of claim 1, further comprising:
the second circuit comprising the second clock, wherein the second circuit is configured to:
capture the plurality of second timestamps from the second clock and, when capturing a second timestamp of the plurality of second timestamps, transmit one of the plurality of sampling signals to the first circuit;
receive the plurality of first timestamps from the first circuit;
generate a second conversion parameter for converting a time of the second clock of the second circuit to a time of the first clock of the first circuit based at least in part on the second plurality of timestamps and the first plurality of timestamps; and
store the second conversion parameter.

13. The device of claim 12, wherein the second circuit is further configured to:
receive a packet over a network;
capture a received timestamp for the packet from the second clock indicating when the packet is received;
convert the received timestamp to generate a converted received timestamp based at least in part on the stored second conversion parameter;
append the converted received timestamp to the packet; and
transmit, to the first circuit, the packet including the converted received timestamp.

14. A system, comprising:
a first circuit comprising a first clock, the first circuit being communicatively coupled to a second circuit, wherein the first circuit is configured to:
receive a plurality of sampling signals from the second circuit;
capture a plurality of first timestamps from the first clock, each respective first timestamp of the plurality of first timestamps being captured upon receipt of a respective one of the plurality of sampling signals;
receive a plurality of second timestamps from the second circuit, each respective second timestamp of the plurality of second timestamps having been captured by the second circuit from a second clock upon transmission of a respective one of the plurality of sampling signals to the first circuit;
generate a first conversion parameter for converting from the second clock of the second circuit to the first clock of the first circuit based at least in part on the plurality of first timestamps and the plurality of second timestamps; and
store the first conversion parameter.

15. The system of claim 14, wherein the first circuit comprises a host processor and the second circuit comprises a network interface controller.

16. The system of claim 14, wherein the first circuit is communicatively coupled to the second circuit via a sampling channel and a data channel, the plurality of sampling signals are received from the second circuit over the sampling channel, and the plurality of second timestamps are received from the second circuit over the data channel.

17. The system of claim 14, wherein the first circuit is further configured to:
receive a packet from the second circuit, the packet comprising a received timestamp captured from the second clock and a presentation timestamp;
convert the received timestamp based at least in part on the stored first conversion parameter;
generate a waveform based at least in part on the packet; and
provide the waveform for output in accordance with a time corresponding to the presentation timestamp.

18. The system of claim 14, wherein the first circuit is further configured to:
transmit a packet to the second circuit for transmission over a network;

receive a transmission complete packet from the second circuit, the transmission complete packet comprising a transmitted timestamp corresponding to the transmitted packet; and convert the transmitted timestamp for the packet based at least in part on the stored first conversion parameter.

19. The system of claim 14, wherein the first circuit is further configured to:

receive a plurality of third timestamps from the second circuit, each of the plurality of third timestamps having been captured based on a third clock of the second circuit upon transmission of one of the plurality of sampling signals to the first circuit;

generate a second conversion parameter for converting from the third clock of the second circuit to the first clock of the first circuit; and transmit an indication to the second circuit of one of the first or second clocks to be used for capturing timestamps.

20. An apparatus comprising:

a first circuit comprising a first clock, the first circuit being communicatively coupled to a second circuit via a sampling channel and a data channel, and the first circuit configured to:

capture a first timestamp responsive to receipt of a sampling signal from a second circuit over the sampling channel;

receive, from the second circuit over the data channel, a second timestamp captured by the second circuit from a second clock, the second timestamp having been captured when the sampling signal was transmitted to the first circuit;

generate a first conversion parameter for converting from the second clock to the first clock; and store the first conversion parameter.

21. A non-transitory computer readable medium storing a computer product comprising code to perform one or more operations, the code comprising:

code to capture, by a first circuit having a first clock, a first timestamp responsive to receipt of a sampling signal from a second circuit;

code to receive, by the first circuit from the second circuit, a second timestamp captured by the second circuit from a second clock, the second timestamp having been captured when the sampling signal was transmitted to the first circuit;

code to generate, by the first circuit, a first conversion parameter for converting from the second clock to the first clock;

code to transmit, by the first circuit to the second circuit, a packet for transmission over a network;

code to receive, by the first circuit from the second circuit, a transmission complete packet that includes a transmitted timestamp captured by the second circuit from the second clock when the packet was transmitted over the network by the second circuit; and code to convert, by the first circuit, the transmitted timestamp based at least in part on the first conversion parameter.

* * * * *